United States Patent [19]
Lang et al.

[11] Patent Number: 6,007,446
[45] Date of Patent: Dec. 28, 1999

[54] DRIVE UNIT

[75] Inventors: Heinrich Lang, Ergersheim; Wolfgang Seiboth, Bad Windsheim, both of Germany

[73] Assignee: Mekra Lang GmbH & Co. KG, Furth, Germany

[21] Appl. No.: 08/832,926

[22] Filed: Apr. 4, 1997

[30] Foreign Application Priority Data

Apr. 16, 1996 [DE] Germany ............................ 196 15 007

[51] Int. Cl.$^6$ .................................................. F16H 39/10
[52] U.S. Cl. ............................................ 475/149; 475/343
[58] Field of Search ........................... 74/89.14; 359/872, 359/877; 475/149, 343; 318/9, 15

[56] References Cited

U.S. PATENT DOCUMENTS

| | | | |
|---|---|---|---|
| 3,265,362 | 8/1966 | Moody ..................... | 475/149 |
| 4,133,344 | 1/1979 | Hunter et al. ............. | 475/343 |
| 4,641,887 | 2/1987 | Klueting ................... | 475/343 |
| 4,699,024 | 10/1987 | Iida et al. ................. | 475/162 |
| 5,090,261 | 2/1992 | Nakatsukasa . | |
| 5,268,619 | 12/1993 | Vecchiarino . | |
| 5,625,502 | 4/1997 | Hoogenboom et al. ....... | 359/877 |
| 5,823,905 | 10/1998 | Torii et al. ................. | 475/149 |

FOREIGN PATENT DOCUMENTS

| | | |
|---|---|---|
| 0545197A1 | 6/1993 | European Pat. Off. . |
| 7627888 | 3/1977 | Germany . |
| 2846586A1 | 5/1980 | Germany . |
| 3013009A1 | 10/1981 | Germany . |
| 2820541C2 | 10/1986 | Germany . |
| 4006102A1 | 8/1990 | Germany . |
| 4115876 A1 | 11/1991 | Germany . |
| 3434905C2 | 7/1992 | Germany . |
| 4119748C2 | 6/1994 | Germany . |
| 3914334C2 | 8/1994 | Germany . |
| 4311355C2 | 1/1995 | Germany . |
| 5222245 | 2/1977 | Japan . |
| 463738 | 2/1992 | Japan . |
| 91/04172 | 4/1991 | WIPO .................... 359/877 |

OTHER PUBLICATIONS

Search Report, German Application No. 196 15 007.8, dated Sep. 20, 1996.

English Language Abstract for Japanese Patent No. 07195979 A, Published.

English language Abstract for Japanese Patent No. 4–63738 A, Published.

English language Abstract for Japanese Patent No. 52–22245, Published Feb. 19, 1977.

*Primary Examiner*—Dirk Wright
*Attorney, Agent, or Firm*—Dority & Manning, P.A.

[57] ABSTRACT

A drive unit comprising a housing, a first worm gear rotatably mounted in the housing, an axle having a first end secured to the housing and defining a central axis therethrough, and a second worm gear mounted in the housing for rotation about the central axis, the first worm gear meshing with the second worm gear for driving the second worm gear. A planetary drive is mounted concentrically around the central axis and includes an output gear driven responsive to the second worm gear. An annular gear is driven by the output gear concentrically around the central axis for driving a work piece, the axle extending through the planetary drive into an opening within the annular gear. The planetary drive may include a sun gear mounted for rotation with the second worm gear, an annular gear fixed to the housing concentric with the central axis, and at least one planetary gear driven by the sun gear within the annular gear around and spaced from the central axis.

17 Claims, 3 Drawing Sheets

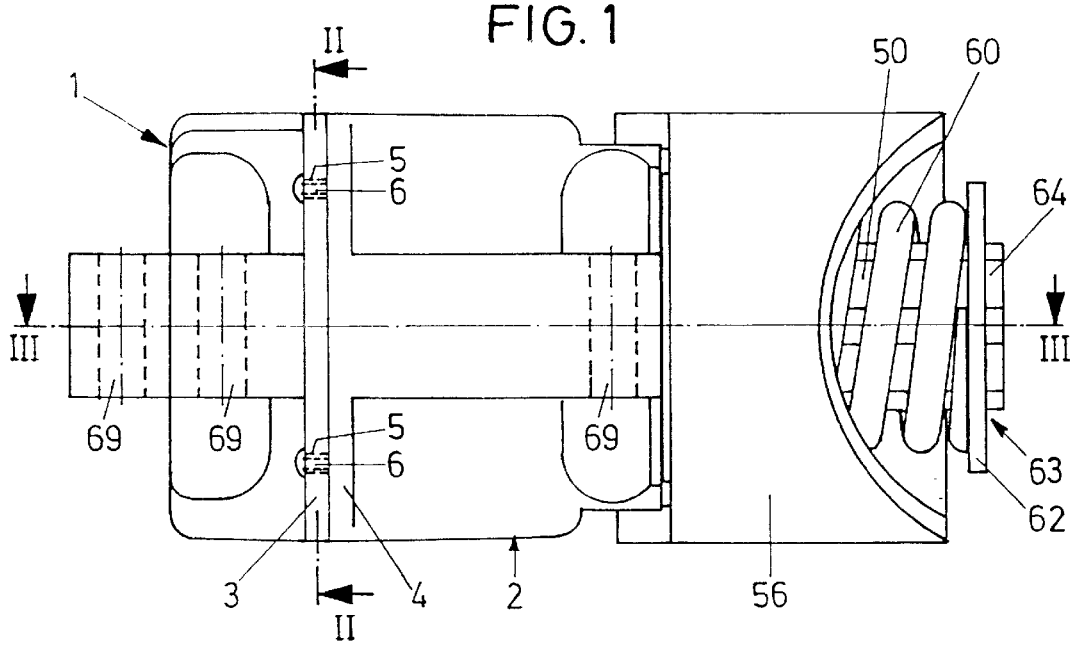
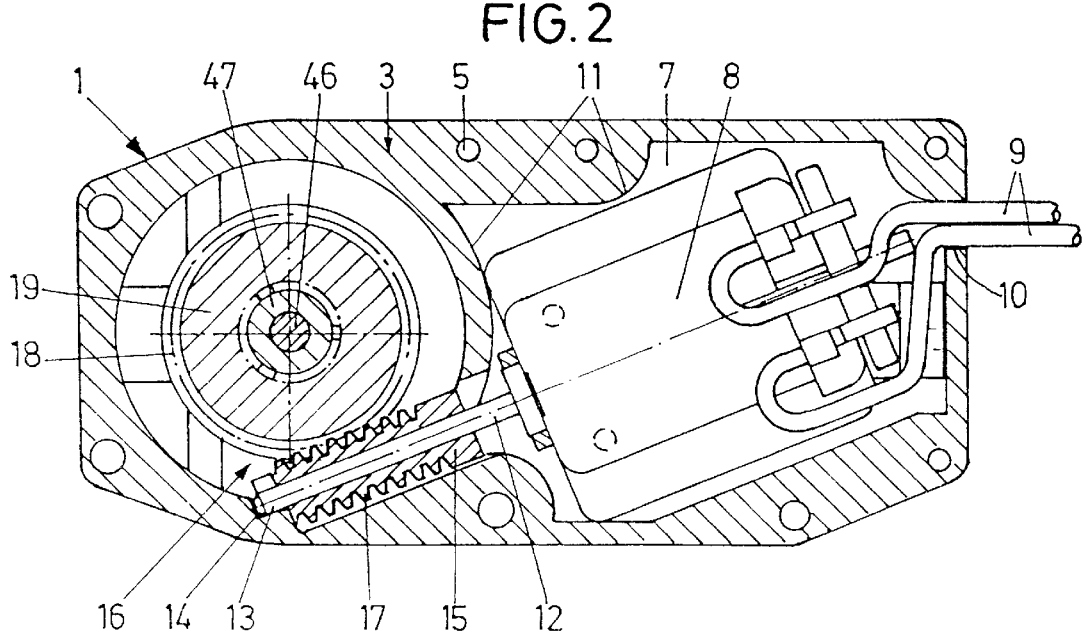

DRIVE UNIT

BACKGROUND OF THE INVENTION

The invention is concerned with a drive unit, and more particularly concerns a gear drive unit including a worm gear mounted on an axle.

Drive units of this type are, as a rule, designed as "motor drive units", that is, in a single housing on the one hand, is an electric motor, and on the other, a multi-step RPM reducing gear train. Motor drive units of this kind are, for example, employed as positioning means installed for external mirrors on motor vehicles, in particular for external mirrors on trucks. The devices are relatively small and serve only for the transfer of small turning moments.

In a conventional drive unit of this type, a worm gear is rotatably secured on a protruding rod of a first housing part; a drive shaft is mounted concentrically in the second housing part with the interposing of a bearing ring. The remaining parts of the drive between the worm gear and the drive shaft are designed to be principally self centering. Mounting of these conventional units is associated with some expense. Further, the drive unit is subject to wear.

OBJECTS AND SUMMARY OF THE INVENTION

Thus the invention has the purpose to formulate a drive unit of the typical kind in such a way that it will be resistant to wear, operate with low friction and be easy to install. This purpose will be solved in accord with the invention by means of the features of the claimed invention. The axle serves to accept the bending forces which arise in the multi-step reducing gear drive, especially bending forces from the worm gear induced torques. Further, the axle, which extends over the entire length of the of the multi-step reducing drive is fixed at both ends. Thus, on the account that the bending forces are picked up by the axle, the forces do not intrude into the zone of the multiple gears. This has the effect that no external forces causing friction occur, beyond the normal gear friction, and also abrasion due to such forces is avoided. The mounting and assembly is eased because all components of the step-down gear transmission are slipped over the axle shaft.

The claimed invention also provides advantageous methods for the securing, i.e. bearing seating, of the axle and the design of the same.

The claimed invention also includes various formulations of the gear drive.

Additional objects and advantages of the invention will be set forth in part in the following description, or may be obvious from the description, or may be learned from practice of the invention.

Further features, advantages, and details of the invention evolve from the following description of an embodiment with the aid of drawings.

BRIEF DESCRIPTION OF THE DRAWINGS

There is shown in:

FIG. 1 a side view of a motor drive unit according to the present invention,

FIG. 2 a section through the motor drive unit in accord with section line II—II in FIGS. 1 and 3, FIG. 3 a section through the motor drive unit in accord with the section line III—III in FIG. 1, FIG. 4 a profile view of the entire length of a power take-off annular gear assembly, FIG. 5 a front view of the annular gear in accord with viewing arrow V in FIG. 4, and FIG. 6 a plan view of a retaining ring disk.

DESCRIPTION OF THE PREFERRED EMBODIMENTS

Figure 3:
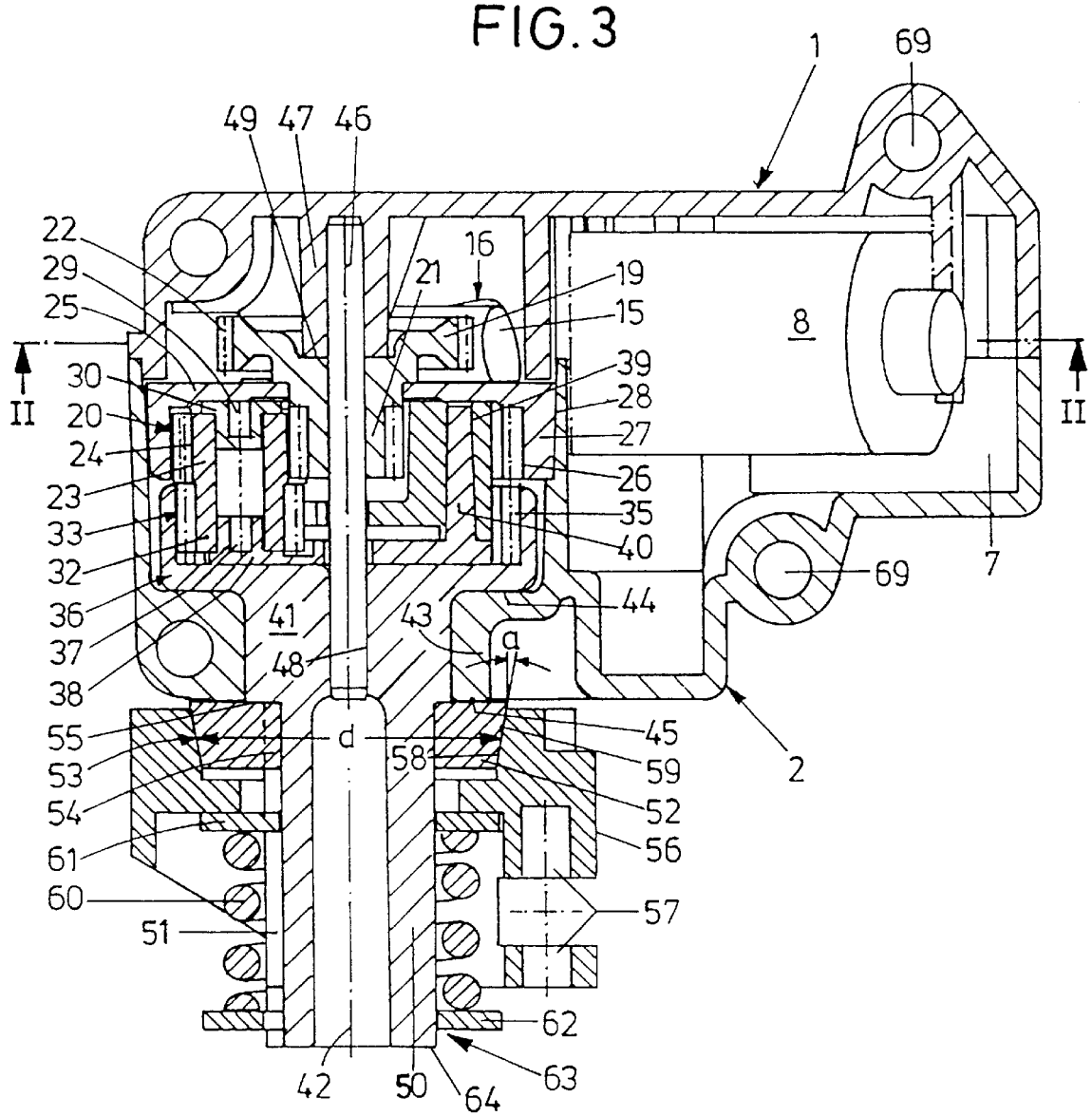

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment can be used on another embodiment to yield yet another embodiment. It is intended that the present invention include such modifications and variations.

The motor drive unit presented in the drawing exhibits a housing comprised of a housing under-piece 1 and a housing upper-piece 2, both composed of a weldable, thermoplastic. Both housing pieces are provided with mating flanges 3, 4. The flange 3 of under-piece 1 has centering holes 5, while the flange 4 of the housing upper-piece 2 is provided with pins 6 which are to be inserted into the centering holes 5, and following the mounting and closing of the housing under-piece 1 and the housing upper-piece 2 these are welded so that they serve simultaneously for a firm connection of the housing under-piece 1 and the housing upper-piece 2.

The housing 1, 2 is provided with an accepting space 7 for an electric motor 8, the electrical connections 9 for which are brought in through an opening 10 in the space 7. The motor 8 is rotationally reversible, hence can be driven in both directions. The electric motor 8 is placed in the space 7 abutting the detenting points 11. Hence, with its installation in the housing under-piece 1, said motor is already aligned.

The electric motor 8 is provided with a freely protruding shaft 12 extending out of the housing 1,2. The remote free end 13 of said shaft 12 is supported in a molded bearing shell 14 in the housing under-piece 1. On the shaft 12, which is composed of steel, a plastic cylindrical worm gear 15 is affixed, preferably by press fit, and is non-rotatable with respect to the shaft.

The helical cogging 17 of the worm 15 engages in a corresponding fitting cogging 18 of a worm gear 19, which, in combination with the worm 15, forms the worm gear drive 16. A planetary gear system 20 is sequential to this worm gear drive 16. The planetary drive exhibits a sun gear 21 non-rotatably affixed to the worm gear 19 and turning therewith as one piece. The outer cogging 22 of sun gear 21 accommodates three planetary gears 23, of which only one is shown, engaging these with their corresponding outer cogging 24. Beyond this the planetary gears 23 engagingly contact an annular hollow gear 25, which is provided with an inner cogging 26, into which the respective outer cogging 24 of the planetary gears 23 fit. The annular gear 25 is non-rotatable in respect to the housing 1,2, which allows it to be provided on its circumference with projections 27 which enter into complementary recesses 28 in housing 1,2. The planetary gears 23 are rotatably borne on bearing pins 29 of a web under-piece 30 and are thus held in equal angular displacement, one from the other.

The planetary gears 23 are again designed to serve as a gear 32 of an annular gear drive 33. The outer cogging of these gears 32 of the annular gear drive 33 engage in a inner cogging 35 of a annular gear 36 of the annular gear drive 33. In the gears 32 there is engaged a bearing pin 37 of a web upper-part 38. The web under-part 30 and the web upper-part 38 are located centrally on the recess opening 39 formed by the web under-part 30 and are bound together into a housing like web by the connecting members 40 extending from web upper-part 38 into the said recess opening 39.

The annular gear 36 exhibits a cylindrical section 41 extension, which is concentric with the common axis 42 of the worm gear 19, with the planetary drive 20 and with the annular drive 33. The extension 41 is supported in a bearing shell 43, which is an extension of the housing upper-piece 2. The annular gear 36 is further secured concentrically to the turning axis 42, relative to the housing upper-piece 2, by the protruding detent surfaces 44,45 which do not hinder the turning of the annular gear 36, but limits the play, that is, the movability of the annular gear 36 along the turning axis 42, to about 0.1 mm.

The worm wheel 19, the planetary drive 20 and the annular drive 33 form together a step-down, RPM reducing drive.

The worm wheel 19 is set upon a through going, cylindrical axle 46 made of steel, one end of which is press fit into a recess 47 in the housing under-piece 1 making the axle 46 non-rotating in respect to housing under-piece 1. The other end of the axle 46 is supported relatively without play in a cylindrical recess 48 of the annular gear 36, the recess being concentric to rotational axis 42, wherein, however, the non-rotatable axle 46 does not hinder the turning of the annular gear 36. The worm gear 19 is freely turnable on the axle 46 and supported concentrically to the axis 42 against the exposed wall 49 of the recess made in extension 47 of the housing under-piece 1. In the area of the annular gear 36 the axle 46 is axially supported in annular gear 25 of the planet gear drive 20.

The annular gear 36, composed entirely of metal, for instance cast zinc, exhibits a principally cylindrical drive shaft 50 which is connected to the bearing section 41, which drive shaft possesses at least one, preferably two, longitudinal grooves 51, running parallel to the rotational axis 42 and diametrically opposed one to the other with reference to the axis 42. On the drive shaft 50 is installed a friction ring 52 of a slip clutch 53 which engages into the longitudinal grooves, with a projection for each. Through this a firm rotational connection between the annular gear 36 and the friction ring 52 is achieved. The friction ring 52 lies firmly affixed and concentric to the axis 42 against a ring band 55 at the transition from the bearing section 41 to the drive shaft 50. This forms the above referenced detent surface 45.

The drive shaft 50 is enveloped by an actuator 56, which possesses an open interior 57 running concentrically to the rotational axis 42, into which a bolt not shown of a movable part can be engaged. The actuator 56 possesses a frictional surface 58 which lays against a frictional surface 59 of the friction ring 52. The two frictional surfaces 58, 59 are designed to be conical frustums and narrow themselves away from the housing upper piece 2 at a half cone opening angle "a". The angle is about $7° \leq a \leq 15°$ and preferred at $a \approx 15°$.

The actuator 56 is pressed in the direction of the friction ring 52 by means of a preloaded helical compression spring 60, whereby, between the actuator 56 and the friction ring 52 only the friction surfaces 58 and 59 lay on one another. Between these two parts is formed the slip clutch 53, the slip moment of which is determined by the frictional coefficient between the friction surface 59 of the friction ring 52 and the friction surface 58 of the actuator 56. Also contributing to the friction coefficient are the normal (90°) acting force and the average diameter "d" of the frictional surface 58, 59. The force acting between and normal to the friction surfaces 58, 59 is, at any given compression of the spring 60, greater the smaller the half a cone opening angle "a" of the frictional surfaces 58, 59 is. The active force between and vertical to the friction surfaces 58, 59 is, in any case, a multiple greater than the force of the compression spring 60. On this account, the friction ring 52 is made of metal, for instance from cast zinc, while the actuator 56 is comprised of a commercial plastic.

The helical compression spring 60 lies under the a washer doing duty as a pressure disk 61 against the actuator. This pressure disk 61 is likewise non-rotatably affixed to the annular gear 36 in the longitudinal groove 51 by means of projections 54. The frictional moment active between the pressure disk 61 and the actuator 56 is at least about a tenth less than the sliding moment of the slip clutch 53.

The helical compression spring 60 lies furthermore in the area of the free end 64 of the drive shaft 50 against a further washer serving as a counter ring disk 62, which is locked to the drive shaft 50 by means of a bayonet closure 63. The two ring disks consist of metal, for instance steel. They are identical and possess projections 54 which correspond to the longitudinal grooves 51, which are again identical in cross-section to the projections 54 on the friction ring 52.

Figure 5:
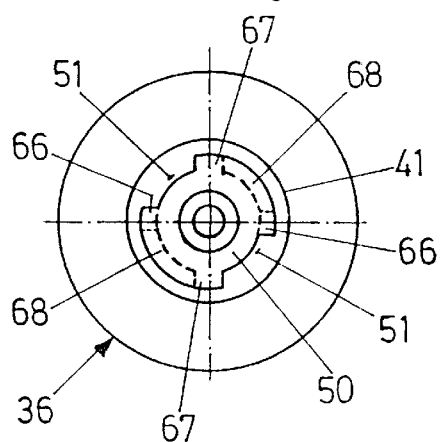
Figure 4:
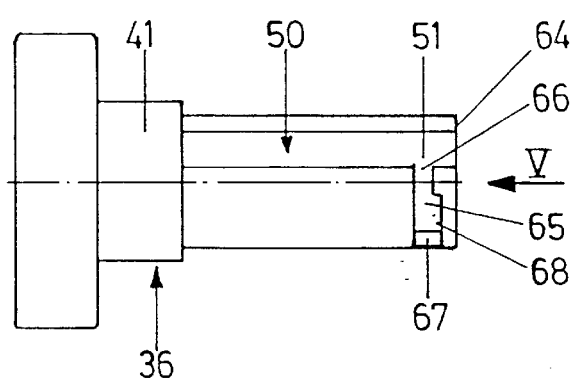
Figure 6:
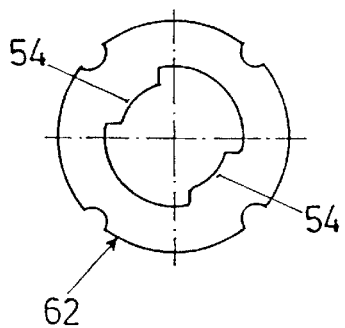

As may be inferred from the FIGS. 4 to 6, in combination with FIG. 3, for the bringing about of the bayonet clamp 63 in the area of the free end of 64 of the driven annular gear 36 on the drive shaft 50 respectively, a partial circumferential groove 65 is placed, which, on the one side runs into a longitudinal groove 51. Each partial circumferential groove is open on one end 66 to a longitudinal groove. Otherwise, the other end 67 to the respective other longitudinal groove 51 is shut. Each partial circumferential groove 65 shows a recess 68 directed to the free end, which corresponds to the projections 54 of the counter ring disk 62.

All gear wheels, with the exception of the driven annular gear 36, consist of plastic and are turnable around the rotational axis 42 or an axis parallel thereto.

The assembly proceeds in such a manner that the electric motor 8 is installed in its receiving space 7 in the housing under-piece 1 and the electric leads 9 are brought in through the opening 10. The free end 13 of the shaft 12, which is already provided with the worm 15 is then placed in the bearing seat 14. First, or later, the axle 46 is pressed into the recess 47. Then the worm gear wheel 19 of the planetary drive 20 is slipped onto the axle 46, until it comes against the detent on the front side 49 of the recess 47.

Subsequently thereto, the annular gear 25 of the planetary gear drive 20 is pushed onto the axle. Then the premounted unit from web under part 30, planetary gears 23 with gears 32 and web upper part 38 are so inserted into the annular gear 25, that the outer cogging 24 of the planetary gears 23 come into working contact with the inner cogging 26 of the annular gear 25. Thereafter, the driven annular gear is slipped on the axle 46, whereby simultaneously the outer cogging 34 of the gears 32, along with the inner cogging 35 of the driven annular gear 36 come into working contact. Beyond this, the axle 46 is accepted in the recess 48 of the driven annular gear 36 and supported concentric to the rotational axis 42. Subsequently to this, the housing upper-piece 2 is set upon the housing under-piece 1, whereby the drive shaft 50 is brought through the bearing shell 43. The pins 6 of the housing upper-piece 2 fit, as this is done, in the centralizing holes 5 of the housing under-piece 1 and, along with the under-piece, are then welded by ultra-sonic means. The driven annular gear 36 is now concentrically secured with its bearing section 41 in the bearing shell 43 of the housing upper-piece 2. At the conclusion of this, the friction ring 52 of the slip clutch 53 is pushed on to the drive shaft 50 and then set upon the actuator 56, so that the two friction surfaces 58, 59 lie one on the other. Then the compression disk 61 is placed on the drive shaft 50 and the helical compression spring 60 also installed on the drive shaft 50. The helical compression spring 60 is preloaded against the frictional ring 52 by means of counter ring disk 62 and the disk 62 locked in place on the driving shaft 50 by means of the bayonet lock 63. As this is done, the counter ring disk 62 is forced on to the free end 64 by the compression of the spring 60 on the free end 64 of the driving shaft 50, and upon reaching the partial circumferential grooves 65 so turned, that the projections 54 enter into in these partial circumferential grooves 65 to the extent that they meet the detents at the closed end 67. Now, when the counter bearing ring disk 62 is released, it will be pushed so far in the direction toward the free end 64 until its projections come to rest in the recesses 68. In these recesses 68 then, the counter bearing ring disk 62 is non-rotatable in respect to the driving shaft 50. Neither can it be released by turning, independently of in which way the driving shaft 50 with the actuator may be rotated about the axis 42.

The finished and assembled motor drive unit can be mounted by means of designed fastening openings 69 on the housing 1,2 for its intended use. Such a use occurs, for instance, in external mirrors of motor vehicles and particularly for external mirrors provided on trucks.

It will be apparent to those skilled in the art that various modifications and variations can be made in the present invention without departing from the scope and spirit of the invention. It is intended that the present invention include such modifications and variations as come within the scope of the appended claims and their equivalents.

Claimed is:

1. A drive unit comprising:
    a housing;
    a first worm gear rotatably mounted in the housing;
    an axle having a first end secured to the housing and defining a central axis therethrough;
    a second worm gear mounted in the housing for rotation around the central axis, the first worm gear meshing with the second worm gear for driving the second worm gear;
    a planetary drive including:
        a sun gear mounted for rotation with the second worm gear;
        a first annular gear fixed to the housing concentric with the central axis; and
        at least one planetary gear driven by the sun gear within the annular gear around and spaced from the central axis; and
        a second annular gear mounted in the housing for rotation around the central axis of the axle for driving a work piece, the second annular gear being driven by the at least one planetary gear, the axle extending through the planetary drive into an opening within the second annular gear.

2. The drive unit of claim 1, wherein the planetary drive includes three planetary gears.

3. The drive unit of claim 1, wherein the axle is press fit into a recess within the housing.

4. The drive unit of claim 3, wherein the housing includes a first piece and a second piece, the recess being disposed within the first piece, the second annular gear being disposed substantially within the second piece.

5. The drive unit of claim 4, wherein the axle has a second end extending into the second piece.

6. The drive unit of claim 1, further including a motor and a shaft driven by the motor, the first worm gear being non-rotatably mounted on the shaft.

7. The drive unit of claim 6, the shaft including a first end spaced from the motor supported by the housing.

8. The drive unit of claim 6, wherein the shaft defines a rotational axis angled relative to the central axis of the axle.

9. The drive unit of claim 1, wherein the second worm gear and the sun gear are unitary.

10. A drive unit comprising:
    a housing;
    a first worm gear rotatably mounted in the housing;
    an axle having a first end secured to the housing and defining a central axis therethrough;
    a second worm gear mounted in the housing for rotation about the central axis, the first worm gear meshing with the second worm gear for driving the second worm gear;
    a planetary drive mounted concentrically around the central axis and including an output gear driven responsive to the second worm gear; and
    an annular gear driven by the output gear concentrically around the central axis for driving a work piece, the axle extending through the planetary drive into an opening within the annular gear.

11. The drive unit of claim 10, wherein the planetary drive includes three planetary gears.

12. The drive unit of claim 10, wherein the axle is press fit into a recess within the housing.

13. The drive unit of claim 12, wherein the housing includes a first piece and a second piece, the recess being disposed within the first piece, and the second annular gear is disposed substantially within the second piece.

14. The drive unit of claim 13, wherein the axle has a second end extending into the second piece.

15. The drive unit of claim 10, further including a motor and a shaft driven by the motor, the first worm gear being non-rotatably mounted on the shaft.

16. The drive unit of claim 15, the shaft including a first end spaced from the motor supported by the housing.

17. The drive unit of claim 16, wherein the shaft defines a rotational axis angled relative to the central axis of the axle.

* * * * *

UNITED STATES PATENT AND TRADEMARK OFFICE
CERTIFICATE OF CORRECTION

PATENT NO.    : 6,007,446
DATED         : December 28, 1999
INVENTOR(S)   : Heinrich Lang et al.

It is certified that error appears in the above-identified patent and that said Letters Patent is hereby corrected as shown below:

<u>Title page,</u>
Item [56], References Cited, U.S. PATENT DOCUMENTS, please list the following:
-- Carton-Bacon 4,880,407    11/1989
Benson            2,569,144    09/1951
Garcia, Jr.       3,648,483    03/1972
Newton            2,974,503    03/1961
Narihiro et al.   4,043,206    08/1977
Frohbieter et al. 4,660,247    04/1987
Nakano            5,092,440    03/1992 --
FOREIGN PATENT DOCUMENTS, please list the following:
-- Great Britain  2054496A    02/1981
France            2509236     01/1983
Germany           468386      04/1927
Great Britain     2064682A    06/1981
Great Britain     139648      03/1920
Germany           4324876C2   06/1995
Germany           3412338C2   07/1986
Soviet Union      211237      02/1968
Soviet Union      193856      03/1967
Germany           3741615A1   06/1989
PCT               9414633     07/1994
OTHER DOCUMENTS, please list the following:
-- EPO Search Report, European App. No. 97104374.0, dated July 25, 1997
English Language Abstract for Soviet Union App. No. 211237, published 03/1968
English Language Abstract for Soviet Union App. No. 193856, published 03/1967
EPO Search Report, European App. No. 97104375.7, dated March 12, 1998
German Search Report, German App. No. 196 15 002.7, dated Sept. 13, 1996 --

Signed and Sealed this

Eleventh Day of November, 2003

JAMES E. ROGAN
*Director of the United States Patent and Trademark Office*